Feb. 11, 1969 P. B. SHORE 3,426,960

PHONOGRAPH RECORD RECEIVING JACKET

Filed Sept. 28, 1967

INVENTOR
PAUL B. SHORE
BY
Kane, Dalsimer, Kane, Sullivan & Smith
ATTORNEYS 3,426,960

PHONOGRAPH RECORD RECEIVING JACKET

Paul B. Shore, 17 Martin Court,
Kings Point, N.Y. 11024

Filed Sept. 28, 1967, Ser. No. 671,376
U.S. Cl. 229—68 1 Claim
Int. Cl. B65d 65/12, 85/30

ABSTRACT OF THE DISCLOSURE

A phonograph record receiving jacket fabricated from a unitary blank of cardboard sheet material and formed to provide an internal record receiving pocket. The blank being elongated to provide three side by side panels, separated by score lines, that are bendable upon one another. Two of the panels are permanently joined to define the pocket with the other panel serving as a cover.

*Background of the invention*

Phonograph record receiving jackets of the type providing, along one edge, an end opening and closed by suitable means along the remaining edges are well known in the art. Generally, jackets of this type are of one-piece construction having been fabricated from a unitary blank of material capable of being folded and secured in the folded position thereby to receive and accommodate a record disc.

Record jackets of this type, while commercially acceptable to the industry and ultimately to the buying public, may be subject to certain disadvantages. For example, improper or negligent handling of a jacket may cause the record disc to slide from within its confines unless the record is extremely snugly contained. Such containment is not particularly advisable. If the record disc is snugly contained there is difficulty in removal of the record disc from the jacket, possibly due to the pair of opposite snug fitting surface walls pressing with distorting pressure on the record disc itself. The record disc is normally easily damaged and has a tendency, when subjected to such pressure over an extended period, to warp. Additionally, such record jackets, after the normal outer cellophane seal is broken, have no structure by which the record disc may be kept free of dust particles.

*Summary of the invention*

The present invention seeks to overcome the disadvantages of the prior art record receiving jackets by providing a jacket of improved construction. In a broad sense the record jacket comprises an elongated unitary blank of sheet material which includes a plurality of substantially similar panels each separated from the adjacent panel by means of a spine portion. The panels are located in side by side relation and are foldable about the respective spines and upon one another. Two of said panels are secured together to form an internal record receiving pocket with the other of the panels providing upon folding a cover for the pocket opening.

Thus, it is a primary object of the invention to provide a phonograph record receiving jacket which includes an internal pocket so that the record may be rather loosely received and a cover therefor so that the same will not free itself from its container.

A further object is to provide a multicolored lithographed record jacket of the stated type which is relatively inexpensive to manufacture and is capable of being manufactured on automatic machinery.

Yet an additional object is to provide a phonograph record receiving jacket of the stated type which may receive a multicolor lithograph on three jacket panels in a single operation.

Other objects and advantages of the invention will readily come to the mind of those skilled in the packaging arts as the description to be read in conjunction with the several drawing figures is developed.

*Brief description of the drawing*

The accompanying drawing illustrates and forms a part of the present invention. By this drawing.

*Brief description of the preferred embodiment*

Figures 1, 2, 4:
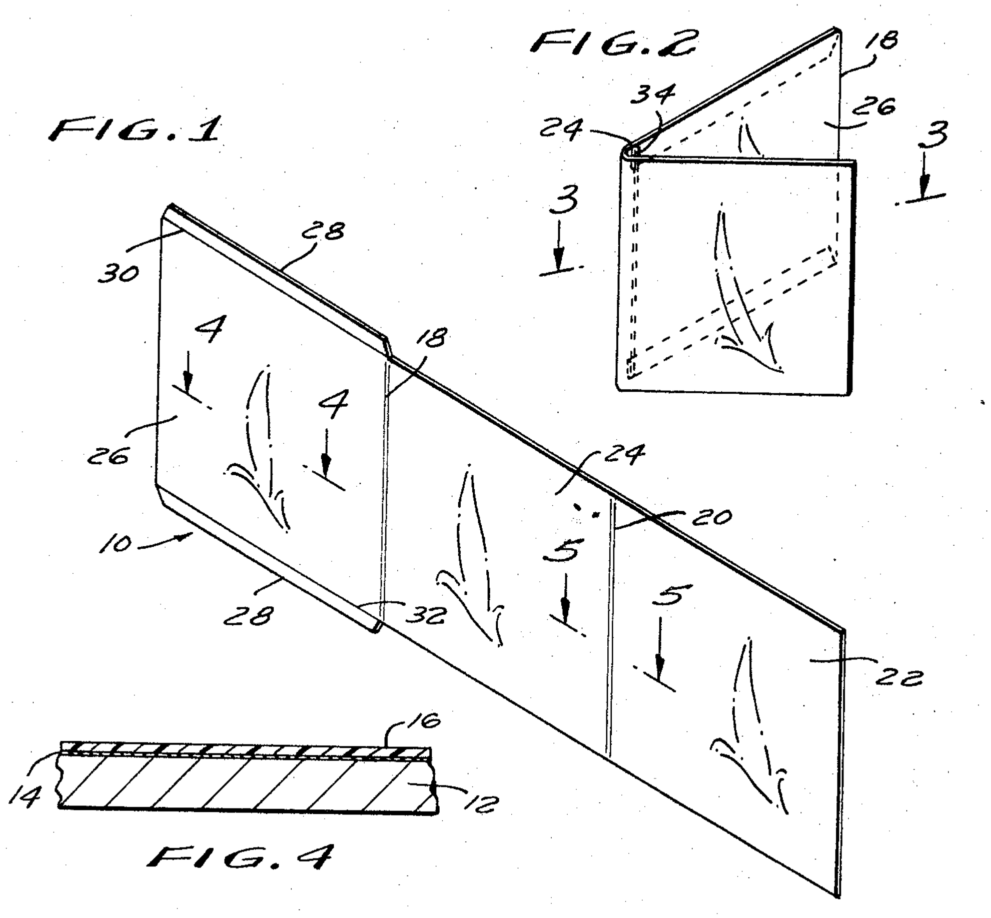
FIGURE 1 is a perspective view of the blank from which the record jacket of FIG. 2 is fabricated.
FIGURE 2 is a perspective view of the preferred record jacket defined by the present invention.
FIGURE 4 is a greatly enlarged horizontal sectional fragmentary view through one panel of the jacket, such as along the line 4—4 in FIG. 1.

The one-piece blank, denoted by the numeral 10, from which the preferred embodiment of the present invention (FIG. 2) is fabricated, is shown in FIG. 1. The blank 10 is of elongated length in one direction and has a lateral dimension which is substantially equal to the diameter of the standard 33⅓ r.p.m. phonograph record disc which is ultimately to be carried by a record receiving pocket.

The blank 10 is a bendable clay coated cardboard sheet material 12 which is capable of receiving either a lithographed multicolor description, pictorial material or advertising matter 14 on one full surface. This is discussed in Shore Patent No. 3,301,467, dated Jan. 31, 1967. As is also discussed the lithograph process may be any of those well known to the printing arts, such as, for example, a four-color process. This process may be carried out in any practical manner and may be carried out on sheet material of varying thickness, such as a thickness in the caliper range of from 12- to 30-points. Sheet material of the foregoing dimensional characteristics, as determined by choice and particular usage, may be employed to equal advantage in the fabrication of the preferred record jacket of FIG. 2.

To protect and seal the lithographed subject matter after application and throughout the life of the jacket the surface is provided with a coating 16 of a clear varnish. FIG. 4 shows, in greatly enlarged fashion, the layer of sheet material, the multicolor lithographed layer and the final protective coating which is applied thereover.

Both FIGS. 1 and 2 show, on all visible panels, certain design material which, as previously mentioned, may be representative of and describe the record selection packaged by the formed jacket. As may be apparent from FIG. 1 the lithographed panel material may be supplied to all front blank panels in a single operation. The panel material may also be applied to selected panels, as choice dictates. Obviously, any incorporation of description or otherwise to the inside front panel 22 is carried out in a separate operation. Obviously too, if this side of panel 22 should be processed a protective coating, such as coating 16, necessarily should be applied for the reasons advanced above.

The blank 10, referring again to FIG. 1, includes a plurality of panels whose surface limits are defined by the lateral dimension of the blank itself and the location of a pair of spines 18 and 20, themselves defined by parallel spaced score lines 18*a*, 18*b* and 20*a*, 20*b*. The panels are substantially equal in surface area and for the sake of description are referred to, with respect to the fabricated record jacket of FIG. 2, as the front panel 22, the back panel 24, and the inside rear panel 26. By means of the respective spines formed by the score lines, as discussed, panels 22–24 and 24–26 are separated from one another by a small distance to not only allow an individual panel to be bent backward upon an adjacent panel but to also provide, when bent, a connecting spine of generally squared configuration thereby to receive and once received to appropriately display intelligence indicia (not shown). This is the well known manner by which record jackets, usually stored in a standing side by side relation to one another, may be identified.

Figure 5:
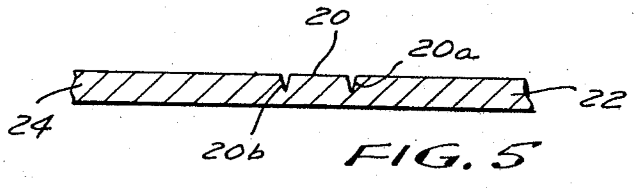
FIGURE 5 is an enlarged horizontal sectional fragmentary view, such as seen along the line 5—5 in FIG. 1, illustrating the spine scoring.

An enlarged view of spine 20 is shown in FIG. 5. Spine 20 includes parallel separated score lines 20*a* and 20*b* around which panels 22 and 24 are capable of bending. Spine 18 is similarly formed.

Returning now to FIG. 1 it is seen that the inside rear panel 26 is provided with an upper and lower flap 28. The flaps 28 are employed in forming a record receiving pocket. The flaps are shown to have flat edges but they may also be contoured thereby to generally conform to the outer, non-playing area of a contained record so as to protect its playing surface.

The flaps 28 are provided with score lines 30 and 32 thereby to facilitate their being bent inwardly about their supporting panel and by an application of an adhesive secured to the inside surface of the adjacent panel. In this regard and for assembly the flaps 28 may also be carried by the rear panel 24.

Figure 3:
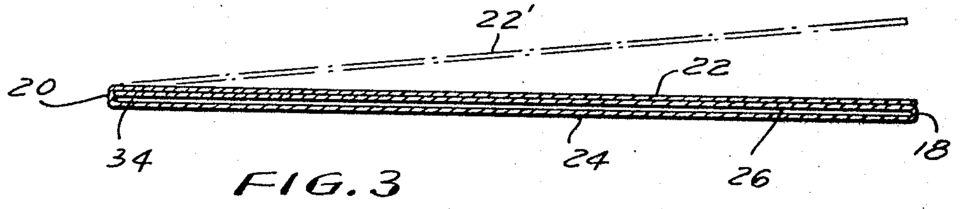
FIGURE 3 is a horizontal sectional view of the record jacket as seen along the line 3—3 in FIG. 2 and showing in full and dotted line the cover flap closed and open position, respectively.

In fabricating the record jacket of FIG. 2 the inside rear panel 26 is bent about the spine 18 which provides an end closure. The flaps 28 are similarly bent and adhesively otherwise secured to the inside surface of rear panel 24 thereby providing a top and bottom closure for a record receiving pocket 34 (FIGS. 2 and 3) in the side opposite the end closure. Pocket 34 is suitably adapted to receive either a single or in some applications a plurality of standard 33⅓ r.p.m. records. Obviously, the invention similarly lends itself to the construction of a jacket adapted for the storage of records of other sizes, for example, 45 r.p.m. records.

Thereafter, the front panel 22 is bent about the spine 20 and in this manner provides a protective cover for the pocket 34 when in the closed position yet movable through the 22′ position (FIG. 3) thereby to open the pocket for record removal.

From the foregoing description it should be apparent that the specified objects and advantages as well as other objects are carried out and present. While this description has been directed to only a preferred embodiment of the invention this discussion has been for illustrative purposes and not by way of limitation since it should be clear that certain changes and modifications may be accomplished which fall within both the spirit and the limits of the invention as defined by the appended claim.

Having described the invention, I claim:

1. A phonograph record jacket adapted to receive a phonograph record disc or the like with an internal pocket thereof, said record jacket formed from a unitary elongated rectangular blank of clay-coated cardboard sheet material having substantially a uniform caliper thickness of from 12 to 30 points throughout, the blank front face receiving in a single operation and over at least one to be described panel and spine portion multicolored design and intelligence lithographed matter, the blank front face thereafter receiving a protective varnish coating application to preserve the multicolored design and intelligence lithographed matter, said blank including three substantially square panels arranged in side by side relation, the adjacent panels being integrally connected and separated one from the other by a first and second spine portion about which said panels are folded and superimposed one over the other with each said spine and panel forming generally a pair of right angular corners therebetween, said first and second spine portions integrally connecting said adjacent panels formed by two score lines extending in a direction lateral to the blank axis and parallel to one another providing a space upon which said intelligence may be received and defining lines of substantially less rigidity than adjacent areas of the blank, and a top and bottom closure flap forming an integral part of the blank and projecting in opposite directions which are lateral to and extending along the axis of the blank, said top and bottom closure carried out by at least adjacent panels and separated from the panel by a flap score line, said at least adjacent panels being folded about said first spine score lines into said superimposed condition and said flaps applied with an adhesive coating on the front face being folded about flap score lines and away from the front face thereby to lie intermediate said adjacent panel sections to adhesively secure the same thereby to define a pocket having an open edge for receipt of said phonograph record disc into the same which is thereafter internally located and covered by the last panel which is hingedly movable about the second spine adjacent the open edge to both an open and closed pocket position.

References Cited

UNITED STATES PATENTS

| | | | |
|---|---|---|---|
| 2,910,222 | 10/1959 | Bermingham et al. | 229—73 |
| 2,986,325 | 5/1961 | Loderhose | 229—68 |
| 3,301,467 | 1/1967 | Shore | 229—68 |

DAVID M. BOCKENEK, *Primary Examiner.*

U.S. Cl. X.R.

206—68